United States Patent
Sledzinski et al.

(10) Patent No.: US 11,784,475 B2
(45) Date of Patent: Oct. 10, 2023

(54) INTERSECTION SYSTEM FOR OVERHEAD CABLE TRAYS

(71) Applicant: Panduit Corp., Tinley Park, IL (US)

(72) Inventors: Bon B. Sledzinski, Westmont, IL (US); Daniel W. Rozendal, Dyer, IN (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/562,745

(22) Filed: Dec. 27, 2021

(65) Prior Publication Data

US 2022/0224090 A1    Jul. 14, 2022

Related U.S. Application Data

(60) Provisional application No. 63/136,289, filed on Jan. 12, 2021.

(51) Int. Cl.
*H02G 3/06* (2006.01)
*F16L 3/06* (2006.01)
*H02G 3/04* (2006.01)

(52) U.S. Cl.
CPC .............. *H02G 3/0608* (2013.01); *F16L 3/06* (2013.01); *H02G 3/0456* (2013.01)

(58) Field of Classification Search
CPC .. H02G 3/0443; H02G 3/0456; H02G 3/0608; F16L 3/06
See application file for complete search history.

(56) References Cited

U.S. PATENT DOCUMENTS

| | | | |
|---|---|---|---|
| 2,656,999 A | 10/1953 | Ullberg, Jr. | |
| 2,662,709 A | 12/1953 | Ullberg, Jr. | |
| 5,917,982 A | * 6/1999 | Vargas | H02G 3/0608 385/134 |
| 5,995,699 A | * 11/1999 | Vargas | G02B 6/4471 385/134 |
| 6,068,220 A | 5/2000 | Alrey | |

(Continued)

FOREIGN PATENT DOCUMENTS

| | | |
|---|---|---|
| CN | 207053089 U | 2/2018 |
| EP | 0315023 A2 | 5/1989 |
| GB | 2267605 A | 12/1993 |

OTHER PUBLICATIONS

Legrand: "Catalog 2016 2017 Cablofil Cable Management PW Ladder Tray Trough Trays Fiber Trough & V-Trough Fasteners J-Hooks FAS Power Brackets & Cabloport"; Jan. 1, 2016, (288 pgs.); retrieved from internet: http://contactfd.com/wp-content/uploads/Catalog-Cablofil-2016-2017.pdf; retrieved on Jun. 14, 2022.

*Primary Examiner* — Christopher Garft
(74) *Attorney, Agent, or Firm* — Christopher S. Clancy; James H. Williams; Aimee E. McVady (57) ABSTRACT

A cable-tray intersection system that connects a first wire basket and an intersecting second wire basket. Each wire basket is formed of a plurality of wires extending horizontally to form a floor and a plurality of wires extending vertically forming side walls. The intersection system includes a top plate mounted on the floors of the wires baskets and a pair of corner braces. The top plate has a first edge, a second edge, and a pair of corner edges formed between the first edge and second edge. The pair of corner braces mount between the first wire basket and the second wire basket and are spaced apart from the top plate.

9 Claims, 11 Drawing Sheets

(56) References Cited

U.S. PATENT DOCUMENTS

| | | | |
|---|---|---|---|
| 6,547,192 B2 | 4/2003 | Rinderer et al. | |
| 7,468,491 B2 * | 12/2008 | Deciry | H02G 3/0608 174/480 |
| 7,471,868 B2 | 12/2008 | Bayazit et al. | |
| 7,476,801 B1 | 1/2009 | Davis et al. | |
| 7,546,987 B2 | 6/2009 | Sinkoff | |
| 7,586,036 B2 | 9/2009 | Davis et al. | |
| 7,668,433 B2 | 2/2010 | Bayazit et al. | |
| 7,742,675 B2 | 6/2010 | Sayres et al. | |
| 7,841,566 B2 | 11/2010 | Kellerman | |
| 8,215,592 B2 | 7/2012 | Boone | |
| 8,254,744 B2 | 8/2012 | Sayres et al. | |
| 8,757,559 B2 | 6/2014 | Davis et al. | |
| 8,950,051 B2 | 2/2015 | Kampf et al. | |
| 8,965,167 B2 | 2/2015 | Bayazit et al. | |
| 9,178,343 B2 | 11/2015 | Brouwer et al. | |
| 9,184,578 B2 | 11/2015 | Winn et al. | |
| 9,356,436 B2 | 5/2016 | Bayazit et al. | |
| 9,447,914 B2 | 9/2016 | Neace | |
| 9,625,669 B2 | 4/2017 | Tally et al. | |
| 10,559,950 B2 * | 2/2020 | Kellerman | H02G 3/385 |
| 11,171,470 B1 * | 11/2021 | White | F16L 3/1218 |
| 2002/0117586 A1 * | 8/2002 | Rinderer | H02G 3/0608 248/49 |
| 2010/0171004 A1 * | 7/2010 | Young | H02G 3/045 29/428 |
| 2010/0230551 A1 * | 9/2010 | Kellerman | H02G 3/0443 248/58 |
| 2012/0312761 A1 * | 12/2012 | White | H02G 3/0608 403/205 |
| 2015/0078809 A1 * | 3/2015 | Winn | H02G 3/0443 403/188 |
| 2016/0077299 A1 * | 3/2016 | Tally | G02B 6/4459 385/135 |
| 2022/0029397 A1 * | 1/2022 | Kellerman | H02G 3/0443 |

* cited by examiner

FIG. 11

INTERSECTION SYSTEM FOR OVERHEAD CABLE TRAYS

CROSS REFERENCE TO RELATED APPLICATION(S)

This application claims benefit to U.S. Provisional Patent Application No. 63/136,289, filed on Jan. 12, 2021, the entirety of which is hereby incorporated by reference herein.

TECHNICAL FIELD

The present application is for a cable tray system used to support cables and couple cable trays at an intersection.

BACKGROUND

Cable tray systems generally provide support for cables such as electrical wiring, conduit and data transmission lines. The cable tray may be a wire-basket cable tray having interconnected metal wires in a mesh.

Cable trays are connected to other cable trays at intersections to route the cables and form a cable tray system. The intersections may be a three-way or T-intersection, or a four-way or cross-intersection.

SUMMARY

According to one embodiment, a cable-tray intersection system is provided. The intersection system connects a first wire basket that intersects a second wire basket along a cable route. Each of the first and second baskets is formed of a plurality of wires extending horizontally to form a floor, and a plurality of wires extending vertically forming the side walls of the basket. The intersection system has a top plate having a first edge for mounting on the floor of the first wire basket, and a second edge for mounting on the floor of the second wire basket. The top plate has a pair of corner edges formed between the first edge and the second edge. Each corner edge is formed on opposite lateral sides of the top plate. A pair of corner braces are mounted between and to the first wire basket and the second wire basket and spaced apart from the top plate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Overhead wire baskets are made of steel wire mesh and are designed to route cables. As two perpendicular wire baskets intersect, it is necessary to secure the junction and cover the ends of wires.

Figure 1:
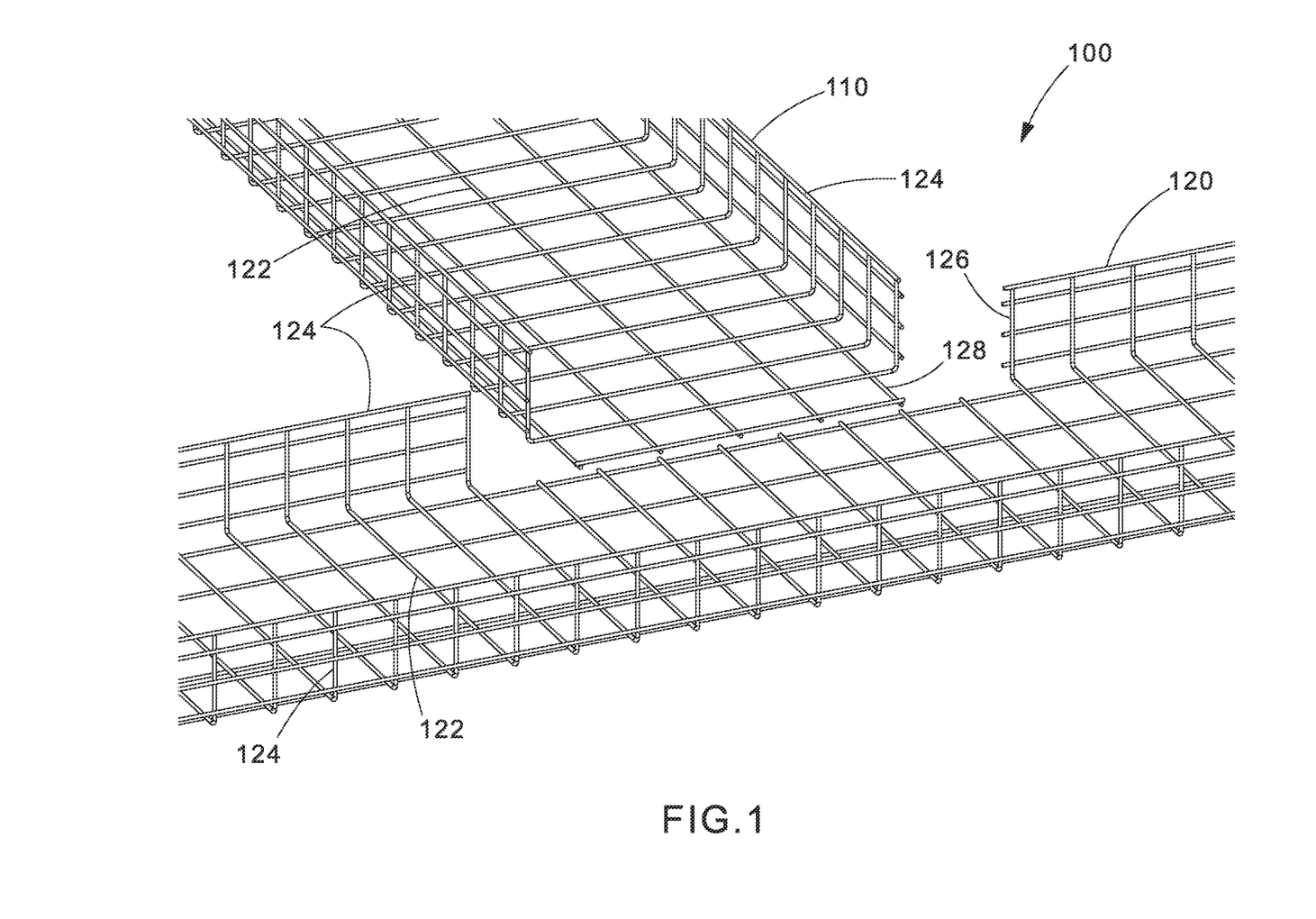
FIG. 1 illustrates a cable-tray system with two wire baskets being arranged to connect at an intersection.

FIG. 1 illustrates a cable-tray assembly 100 with two intersecting wire baskets that are preformed and arranged to connect at an intersection. A first wire basket 110 intersects a second wire basket 120. Each of the first and second baskets 110, 120 is formed of a plurality of crosswires extending horizontally to form a basket floor 122 and a plurality of wires extending vertically forming side walls 124 of the baskets 110, 120.

As shown in FIG. 1, the first wire basket 110 may be a terminating basket having a terminal end 128, whereas the second wire basket 120 may be a continuous wire basket 120 where the floor 122 extends continuously through the intersection.

The intersection is formed by cutting an opening 126 in the side wall 124 from the continuous second wire basket 120 and abutting it to the end 128 of the terminating first wire basket 110 at the cut opening location 126. The side walls 124 of the terminating wire basket 110 may be cut off, to provide corner relief as described later, while allowing the floor wires 122 of the terminating wire basket 110 to come as close as possible to the continuous wire basket 120. Minimizing the gap between the floor wires of the terminating wire basket 110 and the continuous wire basket 120 increases the strength of the intersection.

Figure 2:
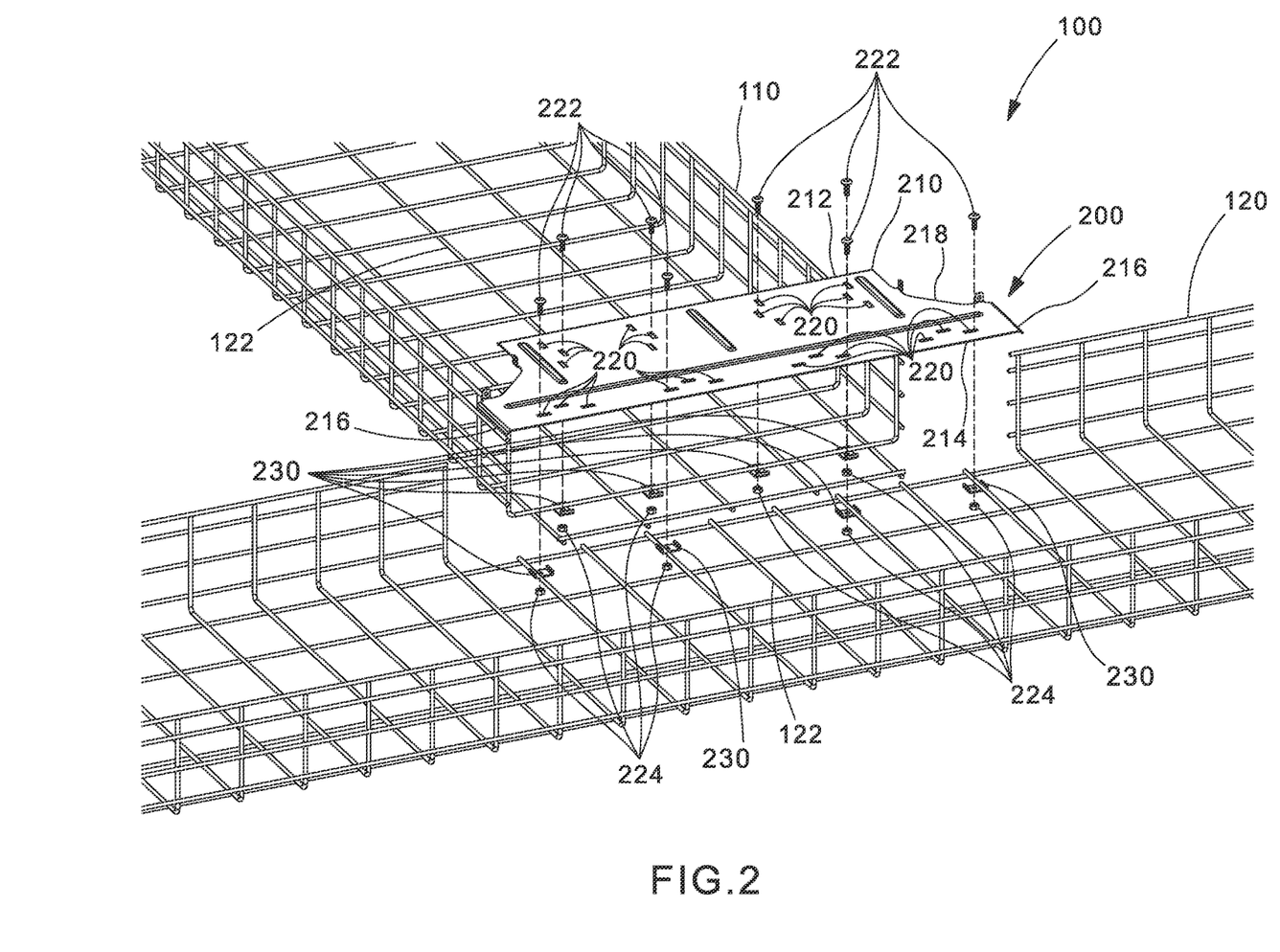
FIG. 2 illustrates the cable-tray system of FIG. 1 with an exploded view of the top plate and clamps according to one embodiment.

As shown in FIG. 2, the cable tray system 100 has a preformed intersection system 200 to securely join the first wire basket 110 to the second wire basket 120. The intersection system 200 has of a top plate 210 which covers cut ends 128 of the wire basket floor wires 122 and provides rigidity to the assembly. Other prior cable-tray systems do not allow for a continuous wire basket and instead may have multiple terminating wire baskets adjoining at an intersection. In these systems, the top plate is required to span the entire intersection. This requires the top plate to be larger, and heavier and provide all the rigidity for the intersection. In these prior systems the top plate is limited to exact sizes of the wire baskets and does not allow for flexible assembly variations. The top plate 210 of the present application allows for different configurations of intersections with only one top plate. The top plate 210 may be provided in multiple sizes, specific for each terminating wire basket 110 width, however the size of the top plate 210 is independent of the second wire basket 120 and can be used with any width continuous basket 120. While also being lighter, the top plate 210 provides increased rigidity over prior designs because the continuous wire basket 120 itself spans the intersection.

The top plate 210 has a first edge 212 for mounting on the floor 122 of first wire basket 110, and a second edge 214 for mounting on the floor 122 of the second wire basket 120. The top plate 210 has a pair of corner edges 218 formed between the first edge 212 and second edge 214. Each corner edge 218 is formed on opposite lateral sides 216 of the top plate 210. The edges 212, 214, 216 of the top plate 210 may be rounded flanges or bent perpendicular to the direction of cable routing, to prevent abrasion or damage to cables from the edges of the top plate 210.

Figure 3:
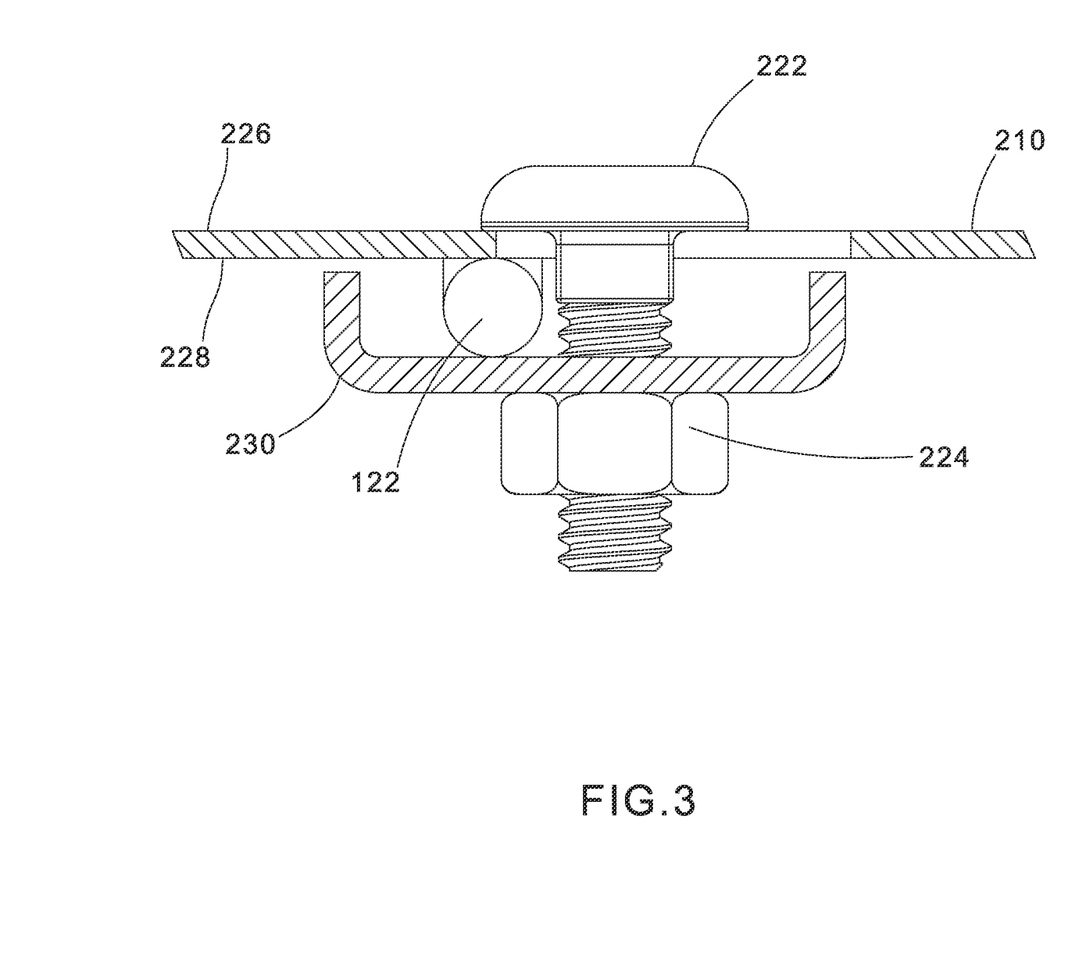
FIG. 3 illustrates a cross section through a clamp location between the top plate and the floor of the wire basket.

The top plate has a plurality of elongated slots 220 extending through the top plate 210 from the upper surface 226 to the lower surface 228, as shown in FIG. 3. A plurality of carriage bolts 222 fit through slots 220 in the top plate 210. U-shaped clips 230 clamp the crosswires on the floor 122 to the top plate 210 and are secured to the carriage bolts 222 with locknuts 224. Since the location of the top plate 210 can vary with respect to the location of crosswires on the floor 122, the slots 220 must be long enough or be arranged in groups of shorter slots, to assure that each U-clip 230 can reach a crosswire. FIG. 3 illustrates a cross-section through a clamp location between the top plate 210 and the floor 124 of the wire basket in more detail.

Figure 4:
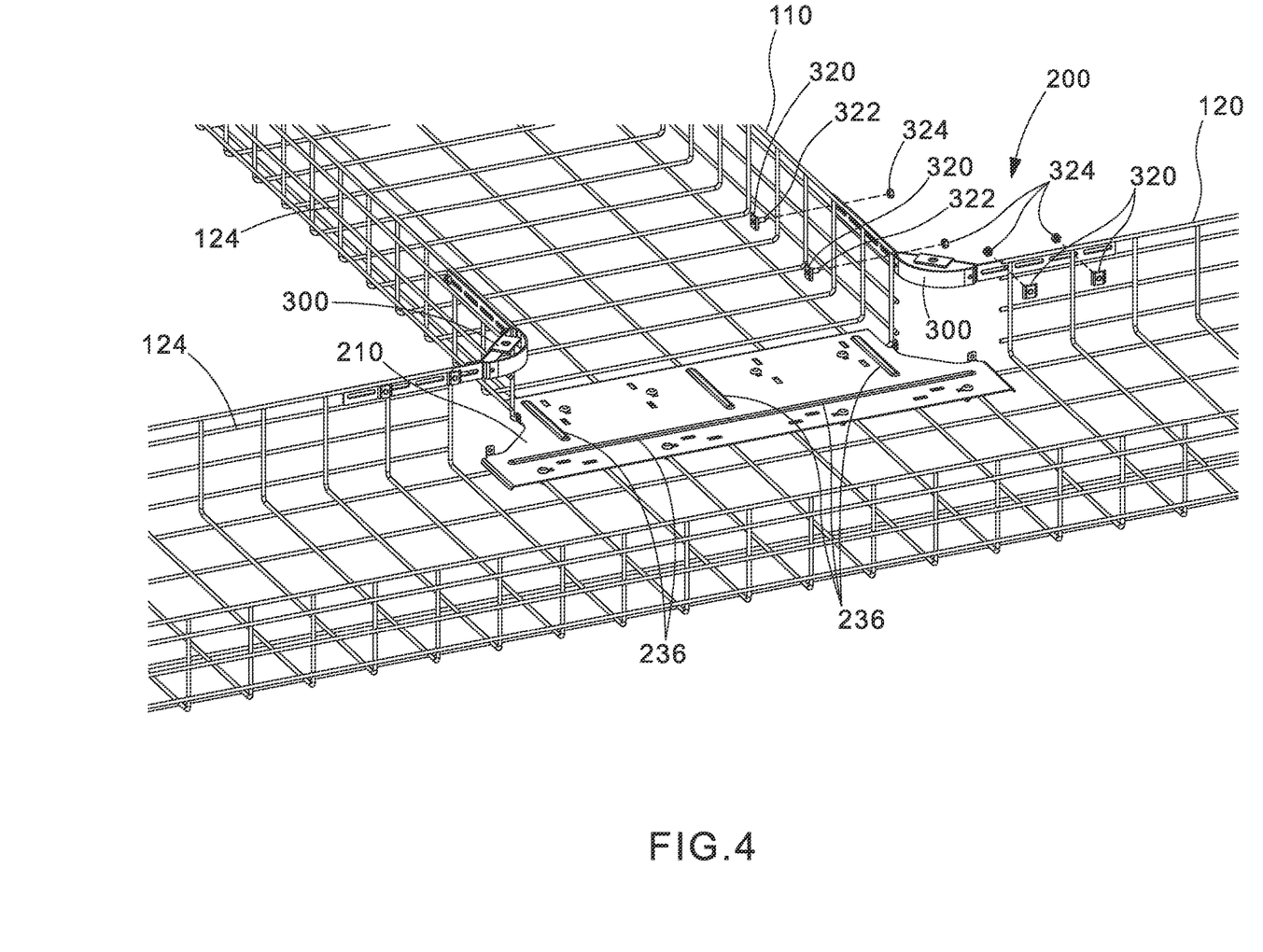
FIG. 4 illustrates the cable-tray system of FIG. 2 with a pair of corner braces.

FIG. 4 illustrates a partially exploded view of the cable-tray intersection system 200 showing the top plate 210 assembled to the floor 122 of the first and second wire baskets 110, 120. The top plate 210 may include beads 236 to increase its rigidity and the rigidity of the intersection. FIG. 4 also illustrates the intersection system 200 having a pair of corner braces 300. The corner braces 300 are mounted between to the first wire basket 110 and the second wire basket 120 and spaced apart from the top plate 210. The corner braces 300 are attached to the side walls 124 of each of the wire baskets 110, 120 to stiffen the cable-tray assembly 100.

Figure 5:
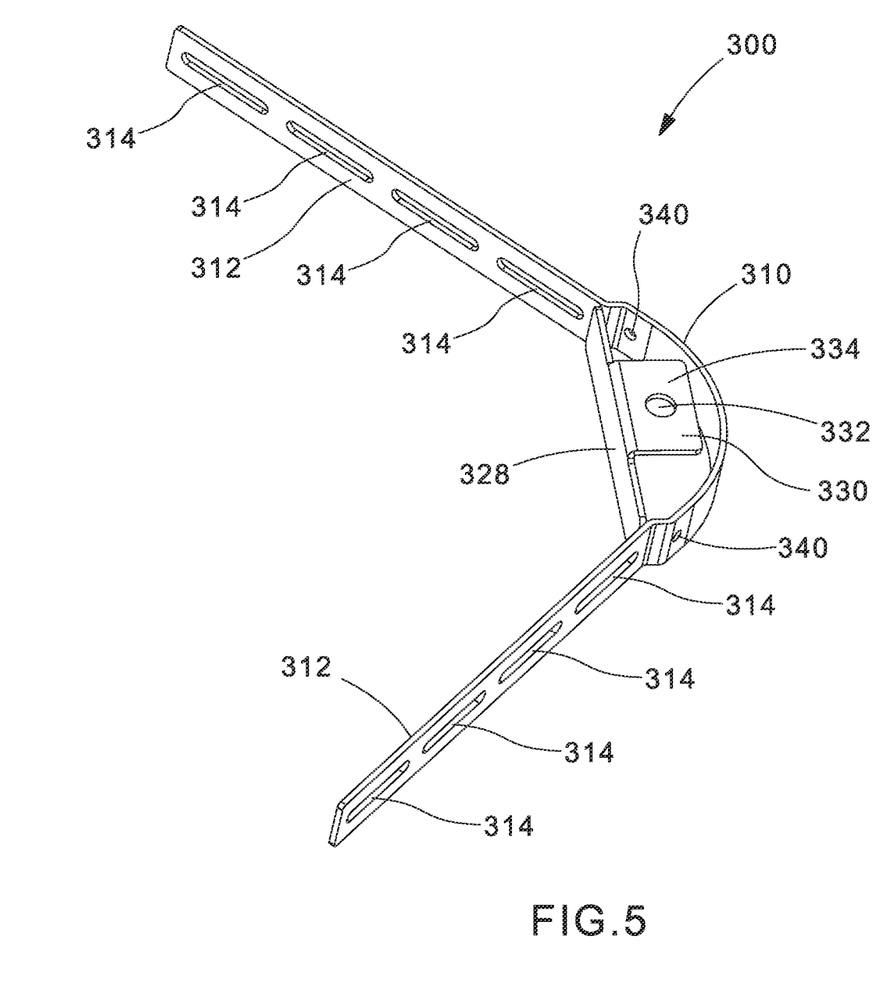
FIG. 5 illustrates one of the corner braces in more detail.
Figure 6:
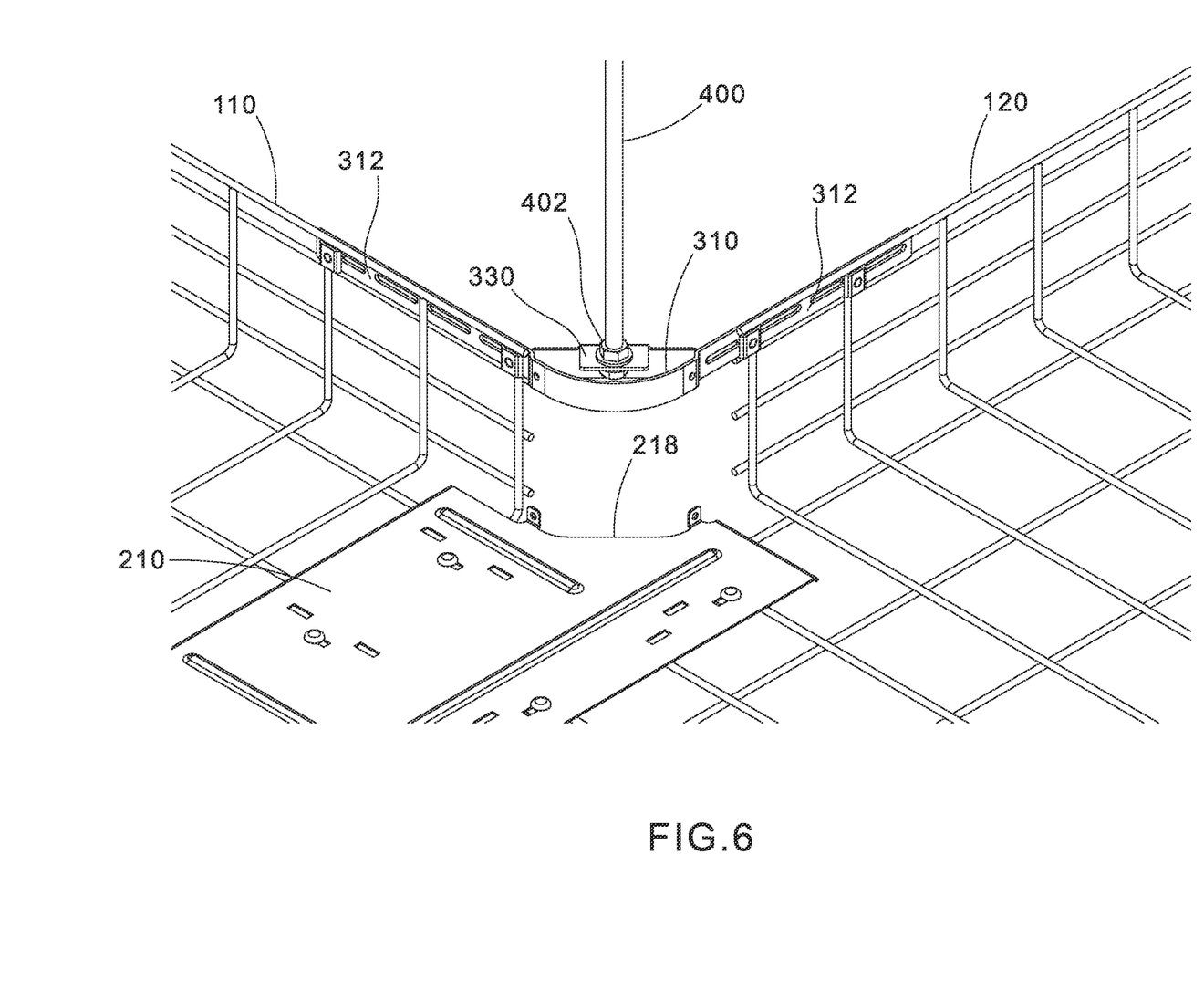
FIG. 6 illustrates the cable-tray system in FIG. 4 with one of the corner braces suspended by a support rod.

Each corner brace 300 is rigid and formed of metal. FIG. 5 illustrates the corner brace 300 in more detail. Each corner brace 300 has radial central portion 310 and a pair of rigid legs 312. As shown in FIG. 6, one leg 312 is secured to the first wire basket 110 and the other leg 312 is secured to the second wire basket 120.

The corner braces 300 are secured to the wire baskets 110, 120 using clips 320. As shown in FIG. 4, the clips 320 may have studs 322 configured to extend through and engage slots 314 (see FIG. 5) on the corner brace 300. The studs 322 may be threaded studs to engage a corresponding nut 324 to clamp the vertical crosswires along the side walls 124 of the wire baskets 110, 120 to the corner braces 300. The studs 322 may be any threaded fastener or other suitable fastener to secure the clips 320 to the slots 314.

To reduce the deflection of the intersection and provide further rigidity, the corner braces 300 may have an angled wall 328 connecting the legs 312. The corner braces 300 have a mounting feature 330 for securing a support rod 400 for hanging the cable-tray system 100 in a facility, as shown in FIG. 6.

As shown in FIG. 5, the mounting feature 330 has a hole 332 extending generally vertically to secure the wire baskets 110, 120 to support rod 400. The mounting hole 332 is formed in a tab 334. The support rods 400 which hang from the ceiling, pass through the holes 332. Locknuts 402 secure the intersection system 200 to the support rods 400 (see FIG. 6).

As shown in FIG. 5, the tab 334 may extend from the angled wall 328 or the radial center portion 310. The mounting feature 330 is positioned outside side walls 124 to secure the rods outside of the wire baskets 110, 120. Prior cable-tray systems required the rods to be secured to the top plate which positioned the hanging rods in the cabling pathways. The intersection system 200 having the mounting features 330 outside the wire baskets 110, 120 provides numerous advantages including better cabling pathways without obstacles that impede routing of the cables at the intersection.

Figure 7:
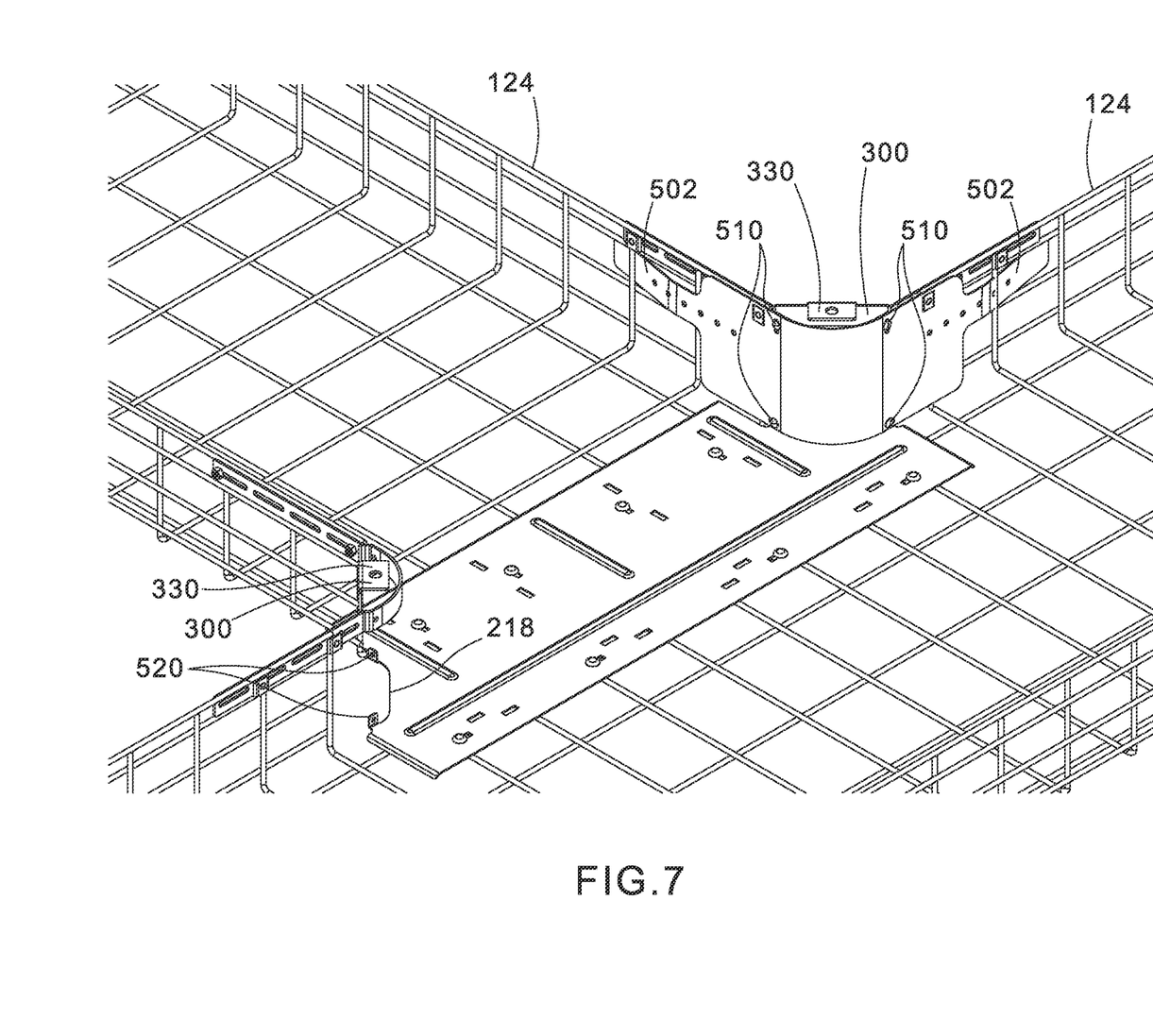
FIG. 7 illustrates the cable-tray system in FIG. 4 with one corner protector installed.

FIG. 7 shows the cable-tray intersection system with one of corner protectors 500 installed. The corner protectors 500 are designed to cover cut wire ends of the side walls 124 and/or the floor 122 and to provide bend radius control to the cables around corners. Each corner protector 500 is positioned between one corner brace 300 and a corner edge 218 of the top plate 210.

Figure 8:
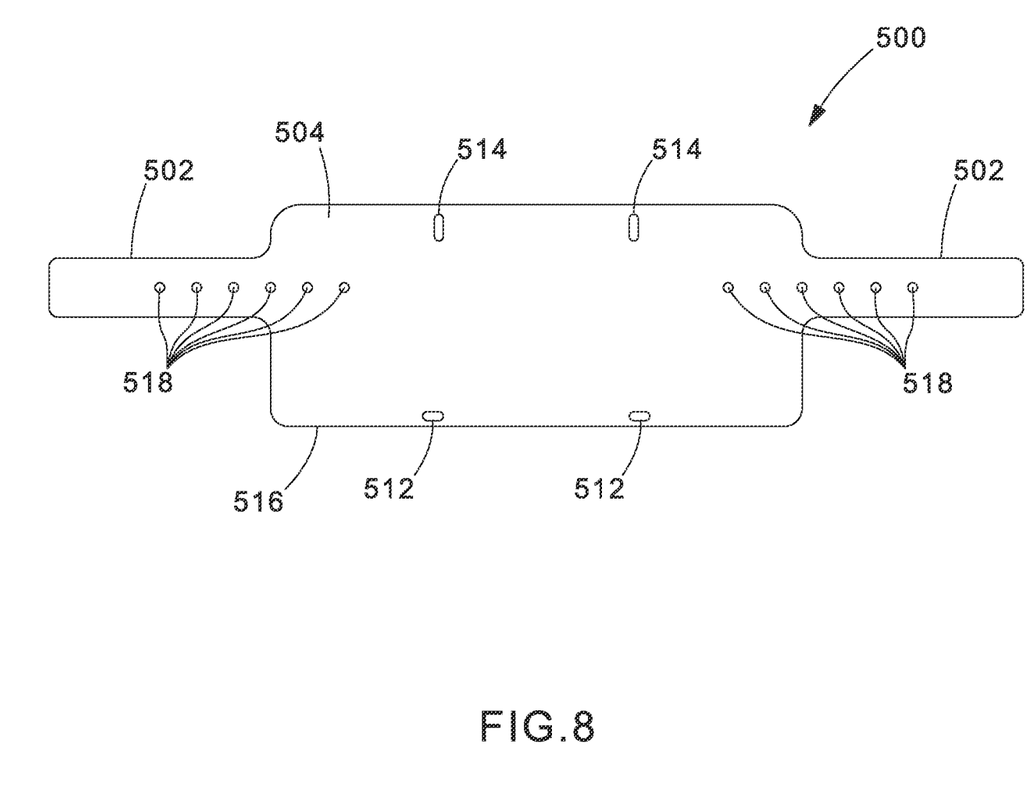
FIG. 8 illustrates one of the corner protectors in more detail.

The corner protectors 500 are formed of flexible plastic. The corner protectors 500 may be made of a flame rated plastic. As shown in FIG. 8 the corner protectors 500 are supplied flat. Each corner protector 500 has a pair of flexible arms 502 extending from opposite sides of a flexible body 504. The corner protectors 500 are installed by first bending the arms 502 under the vertical crosswires of the side walls 124. One arm 502 is secured to the first wire basket 110 and the other flexible arm 502 is secured to the second wire basket 120. Then the corner protectors 500 are secured with fasteners 510 (see FIG. 7) to the intersection system 200. The fasteners 510 may plastic ribbed push-in rivets or Christmas-tree fastener. As shown in FIG. 7, two fasteners 510 are installed through the lower slots 512 and two fasteners are installed through the upper slots 514.

The top plate 210 has a plurality of tabs 520 extending from the corner edges 218. The lower slots 512 are aligned with fastener holes on the tabs 520 and the fastener 510 extends through one of the slots 512 and engages the fastener hole on one of the tabs 520 to secure the corner protector 500 to the top plate 210.

The corner protectors 500 may abut the top plate 210 with no gap or a minimum gap between the bottom edge 516 of the corner protector 500 and the top surface of the top plate 210. The fasteners 510 are installed through the upper slots 514 and engage holes 340 in the corner braces 300. The upper slots 514 are sized to account for height tolerance of the side walls 124 of the wire baskets 110, 120. The lower slots 512 are sized to account for horizontal misalignment between the top plate 210 and the corner braces 300. As such, the corner protectors 500 can be easily secured to the intersection assembly 200 even with tolerance or misalignment issues in the wire baskets. The arms 502 of the corner protectors 500 may be secured to the vertical crosswires of the wire baskets 110, 120 with cable ties threaded through the holes 518 (see FIG. 8).

Figure 9:
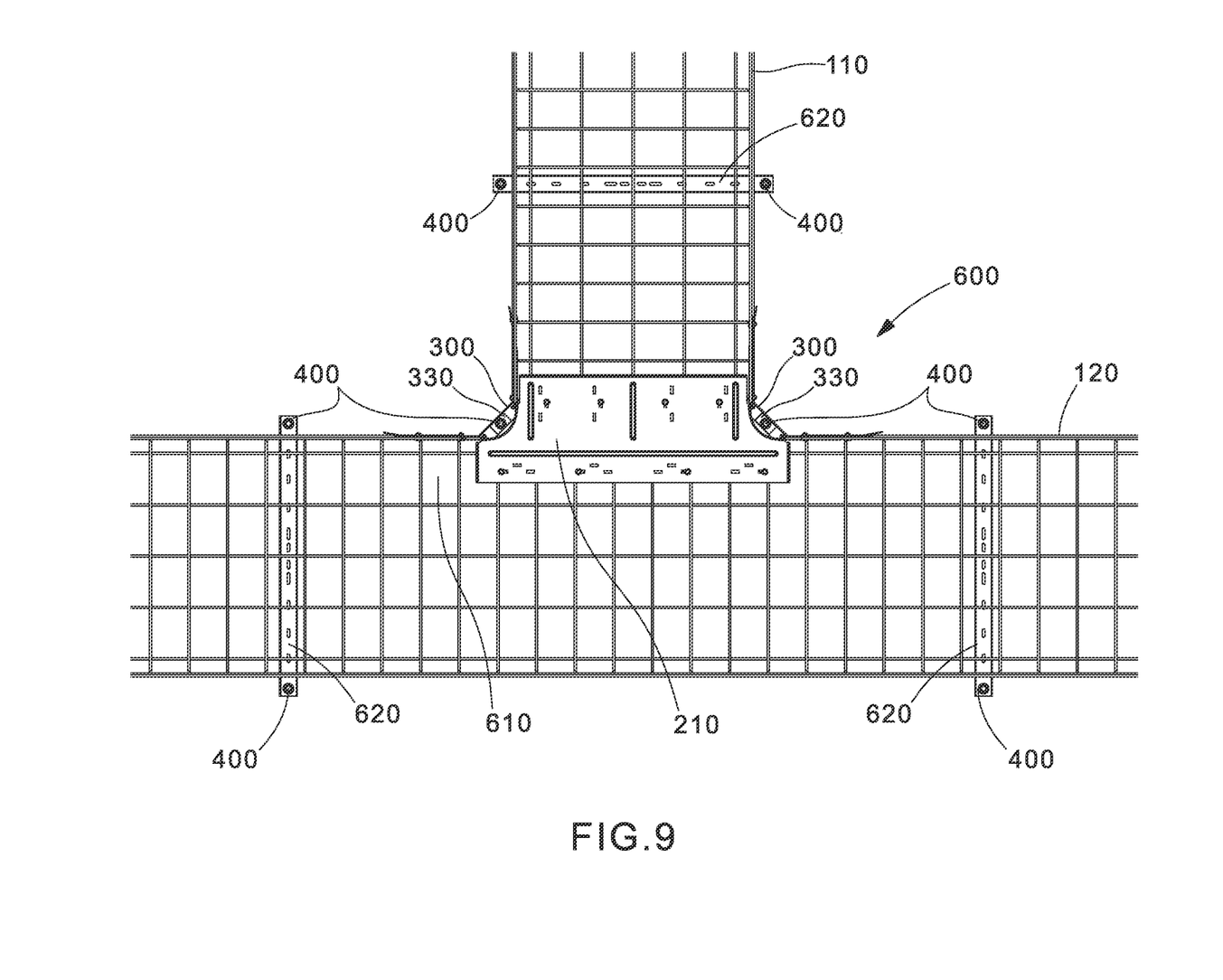
FIG. 9 illustrates a top view of a cable-tray system according to one embodiment having a three-way intersection.
Figure 10:
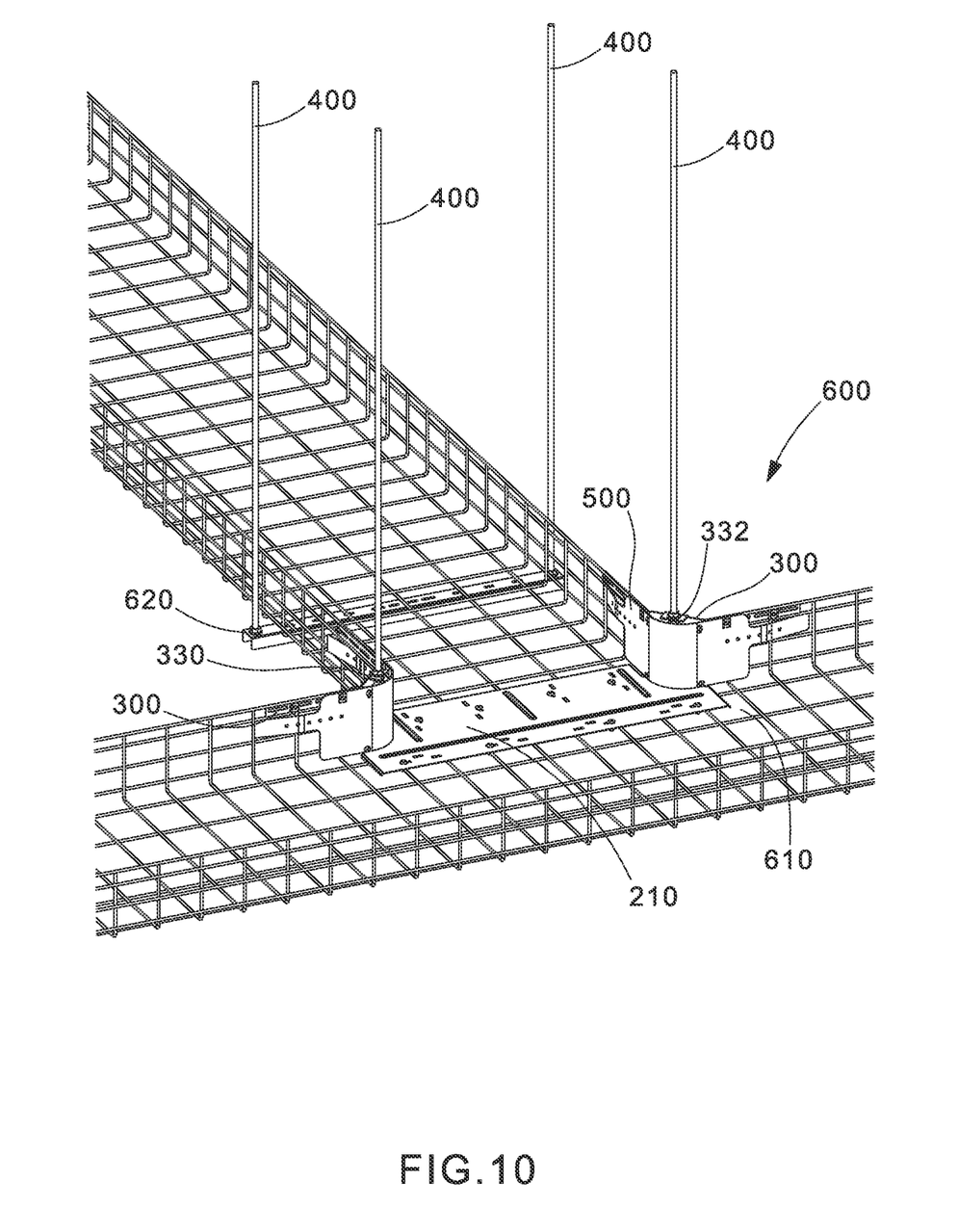
FIG. 10 illustrates a perspective view of the cable tray system of FIG. 9.

The intersection system 200 provides flexibility in providing different intersection configurations without needing different configurations of top plates. For example, FIGS. 9-10 show a cable-tray system 600 using the intersection system 200 that forms a three-way intersection configuration 610. In another example, FIG. 11 shows a cable tray system 700 that forms a four-way intersection configuration 710.

As illustrated in FIG. 9 and FIG. 10, the three-way intersection configuration 610 forms a T-shaped intersection. The three-way intersection configuration 610 uses a continuous wire basket 120 where the first wire basket 110 abuts the opening 126 in the side wall 124 of the continuous wire basket 120. The three-way intersection configuration 610 uses one top plate 210 and one pair of corner braces 300. FIGS. 9-10 also show trapeze brackets 620 offset from the intersection. The trapeze brackets provide mounting features for connecting support rods 400, as is common in typical installations. The present application provides corner braces 300 with mounting features 330 for connecting the support rods 400 to be positioned outboard of the cable pathway at the intersection. Therefore, the support rods 400 adjacent the intersection 610 also align with the support rods 400 at the trapeze brackets 620 along the length of the wire baskets 110, 120, as shown in FIG. 9.

Figure 11:
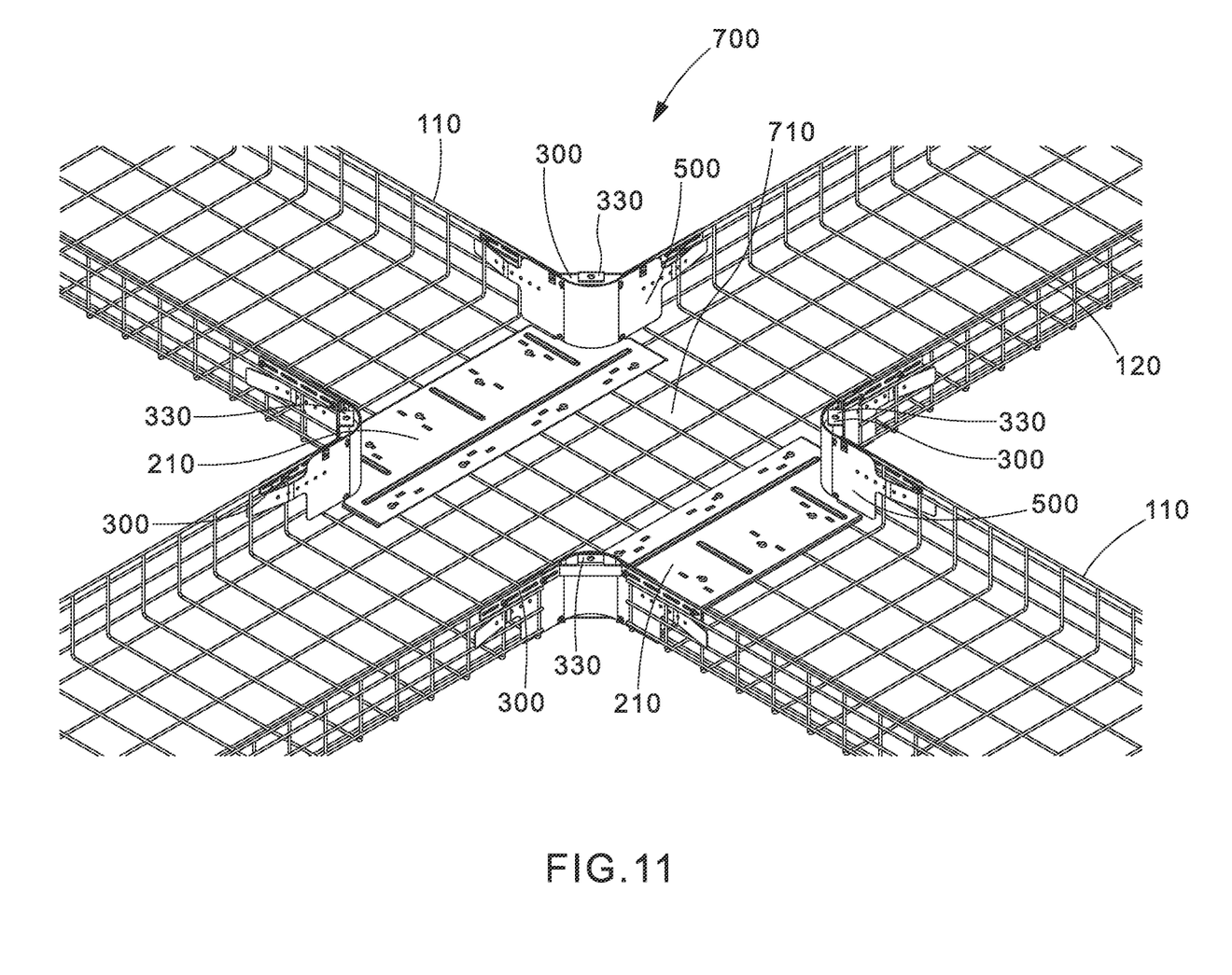
FIG. 11 illustrates a perspective view of a cable tray system according to one embodiment having a four-way intersection.

As illustrated in FIG. 11, the four-way intersection configuration 710 forms a cross-shaped intersection. The four-way intersection configuration 710 uses a continuous wire basket 120 and two terminating wire baskets 110 that each abut openings 126 in opposite side walls 124 of the continuous wire basket 120. The four-way intersection configuration 710 uses two top plates 210 and two pairs of corner braces 300. The four-way intersection configuration 710 may also use trapeze brackets to connect support rods 400. Note that, for clarity, the trapeze brackets and the support rods are not shown in FIG. 11.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cable tray intersection system for connecting wire baskets at an intersection, the cable tray intersection system comprising:
    a first wire basket formed of a plurality of wires extending horizontally to form a floor and a plurality of wires extending vertically forming side walls of the first wire basket, wherein the floor of the first wire basket has a terminal end at the intersection;
    a second wire basket formed of a plurality of wires extending horizontally to form a floor and a plurality of wires extending vertically forming side walls of the second wire basket, wherein the floor of the second wire basket extends continuously through the intersection;
    a top plate having a first edge for mounting on the floor of the first wire basket over a terminal edge of the first wire basket, and a second edge for mounting on the floor of the second wire basket, the top plate having a pair of corner edges formed between the first edge and the second edge, each corner edge formed on opposite lateral sides of the top plate; and
    corner braces spaced apart from the top plate and mounted between the sidewalls of the first wire basket and the second wire basket at the intersection, wherein the corner braces have a radial central portion and a pair of rigid legs with one leg secured to the first wire basket and one leg secured to the second wire basket;
    wherein each corner brace has an angled wall connected to the pair of rigid legs and a mounting feature for securing a rod to hang the wire baskets.

2. The cable tray intersection system of claim 1, wherein the mounting feature comprises a tab with a hole there through extending from the angled wall, wherein the mounting feature extends outside the sidewalls of the first wire basket and the second wire basket.

3. The cable tray intersection system of claim 1, wherein the terminal end of the first wire basket abuts an opening in a side wall of the second wire basket; and the top plate and pair of corner braces secure the first and second wire baskets to define a three-way intersection.

4. The cable tray intersection system of claim 3, further comprising:
    a third wire basket, wherein a terminal end of the third wire basket abuts a second opening in a side wall of the second wire basket opposite the first opening; and a second top plate and a second pair of corner braces secure the second wire basket and the third wire basket to define a four-way intersection.

5. The cable tray intersection system of claim 4, wherein the top plate is spaced apart from the second top plate by a horizontal width of the second wire basket.

6. A cable tray intersection system for connecting wire baskets at an intersection, the cable tray intersection system comprising:
    a first wire basket formed of a plurality of wires extending horizontally to form a floor and a plurality of wires extending vertically forming side walls of the first wire basket, wherein the floor of the first wire basket has a terminal end at the intersection;
    a second wire basket formed of a plurality of wires extending horizontally to form a floor and a plurality of wires extending vertically forming side walls of the second wire basket, wherein the floor of the second wire basket extends continuously through the intersection;
    a top plate having a first edge for mounting on the floor of the first wire basket over a terminal edge of the first wire basket, and a second edge for mounting on the floor of the second wire basket, the top plate having a pair of corner edges formed between the first edge and the second edge, each corner edge formed on opposite lateral sides of the top plate;
    corner braces spaced apart from the top plate and mounted between the sidewalls of the first wire basket and the second wire basket at the intersection, wherein the corner braces have a radial central portion and a pair of rigid legs with one leg secured to the first wire basket and one leg secured to the second wire basket; and
    a pair of corner protectors, wherein each corner protector is positioned between one corner brace and a corner edge of the top plate.

7. The cable tray intersection system of claim 6, wherein each corner protector has a pair of flexible arms, wherein one flexible arm is secured to the first wire basket and one flexible arm is secured to the second wire basket.

8. The cable tray intersection system of claim 6, wherein the top plate has a plurality of tabs extending from the corner edges, wherein the corner protectors have a plurality of slots, wherein fasteners extend through the slots and engage fastener holes in the tabs to secure the corner protectors to the top plate.

9. A cable tray intersection system for connecting wire baskets at an intersection, the cable tray intersection system comprising:
    a first wire basket formed of a plurality of wires extending horizontally to form a floor and a plurality of wires extending vertically forming side walls of the first wire basket, wherein the floor of the first wire basket has a terminal end at the intersection;
    a second wire basket formed of a plurality of wires extending horizontally to form a floor and a plurality of wires extending vertically forming side walls of the second wire basket, wherein the floor of the second wire basket extends continuously through the intersection;

a top plate having a first edge for mounting on the floor of the first wire basket over a terminal edge of the first wire basket, and a second edge for mounting on the floor of the second wire basket, the top plate having a pair of corner edges formed between the first edge and the second edge, each corner edge formed on opposite lateral sides of the top plate;

corner braces spaced apart from the top plate and mounted between the sidewalls of the first wire basket and the second wire basket at the intersection, wherein the corner braces have a radial central portion and a pair of rigid legs with one leg secured to the first wire basket and one leg secured to the second wire basket; and a plurality of U-clips, and wherein the top plate has a plurality of slots, wherein the U-clips extend around a horizontal wire and a fastener extends through one of the slots in the top plate and engages one of the U-clips to secure the top plate to the floor of the first and second wire baskets.

\* \* \* \* \*